United States Patent [19]

Townsend

[11] 4,111,541

[45] Sep. 5, 1978

[54] EXPOSURE SYSTEM FOR ELECTROSTATIC REPRODUCTION MACHINES

[75] Inventor: Robert H. Townsend, Richardson, Tex.

[73] Assignee: Xerox Corporation, Stamford, Conn.

[21] Appl. No.: 748,803

[22] Filed: Dec. 8, 1976

[51] Int. Cl.[2] ........................ G03G 15/28; G03B 27/76

[52] U.S. Cl. ........................................... 355/8; 355/69; 355/71

[58] Field of Search ........................ 355/3 R, 8, 11, 69, 355/71

[56] References Cited

U.S. PATENT DOCUMENTS

| | | | |
|---|---|---|---|
| 3,724,946 | 4/1973 | Knapp et al. | 355/71 X |
| 3,967,896 | 7/1976 | Looney et al. | 355/3 R X |
| 3,977,781 | 8/1976 | Eppe et al. | 355/69 X |
| 3,985,438 | 10/1976 | Kurita | 355/11 |
| 3,995,950 | 12/1976 | Townsend | 355/3 R |

*Primary Examiner*—Fred L. Braun

[57] ABSTRACT

An electrostatic reproduction machine with photosensitive member on which latent electrostatic images of an original being reproduced are made following charging of a photosensitive member, the images being developed or transferred to a sheet of copy paper which is thereafter fused to form a permanent copy. A transparent platen supports the original with one or more lamps being provided to illuminate the original resting on the platen. The light image produced is transmitted by an optical system to the photosensitive member to discharge the same selectively in accordance with the original. A movable optical system is provided to permit the light image to be projected onto and in synchronism with the moving photosensitive member, in accommodation of the relatively low power of the flash lamps.

1 Claim, 3 Drawing Figures

EXPOSURE SYSTEM FOR ELECTROSTATIC REPRODUCTION MACHINES

BACKGROUND OF THE INVENTION

This invention relates to an illumination and exposure system for an electrostatic type reproduction machine, and more particularly to an improved illumination and exposure system using continuous lamps.

Modern high speed electrostatic type copiers or reproduction machines may use flash lamps to illuminate, i.e. expose, the original being copied. Use of this type of lamp is one way of providing the necessary exposure speed for very high speed copying. In these arrangements, the entire original is illuminated by the flash lamps providing what is known to the art as full frame exposure.

Since the originals to be copied may be relatively large, and the entire area must be illuminated fully, flash lamps must generate intense light energy over the span of a few microseconds. To support such illumination intensity in turn requires a very large amount of electrical energy with attendant large, expensive, and relatively dangerous capacitance type power supply.

It is therefore a principal object of the present invention to provide a full frame exposure system for electrostatic type reproduction machines with simplified power supply requirements.

It is another object of the present invention to provide an exposure system wherein the optical path is displaced during imaging in timed relation to movement of the photoreceptor in an electrostatic reproduction machine to thereby permit timed (as distinguished from flash) illumination of the original without blurring using under powered flash lamps.

This invention relates to a reproduction machine for producing copies of an original, comprising in combination, a movable photosensitive member, means to charge the photosensitive member in preparation for imaging; an exposure station whereat the charged photosensitive member is exposed to a light image of the original; a platen for supporting the original; image means forming an optical path for transmitting a light image of the original on the platen to the exposure station and the photosensitive member to form a latent electrostatic image of the original on the member; illumination means adapted to illuminate the platen and the original thereon; optical path displacing means to displace the optical path conjointly and in synchronism with the photosensitive member and in substantial parallelism with the photosensitive member during the exposure thereof to the illuminated original; thereby to project a full frame exposure of the original onto the photosensitive member whereby to form the latent electrostatic image as aforesaid.

For a better understanding of the invention, reference is made to the following detailed description of an exemplary embodiment, given in connection with the accompanying drawing.

DRAWING

DESCRIPTION

Figure 1:
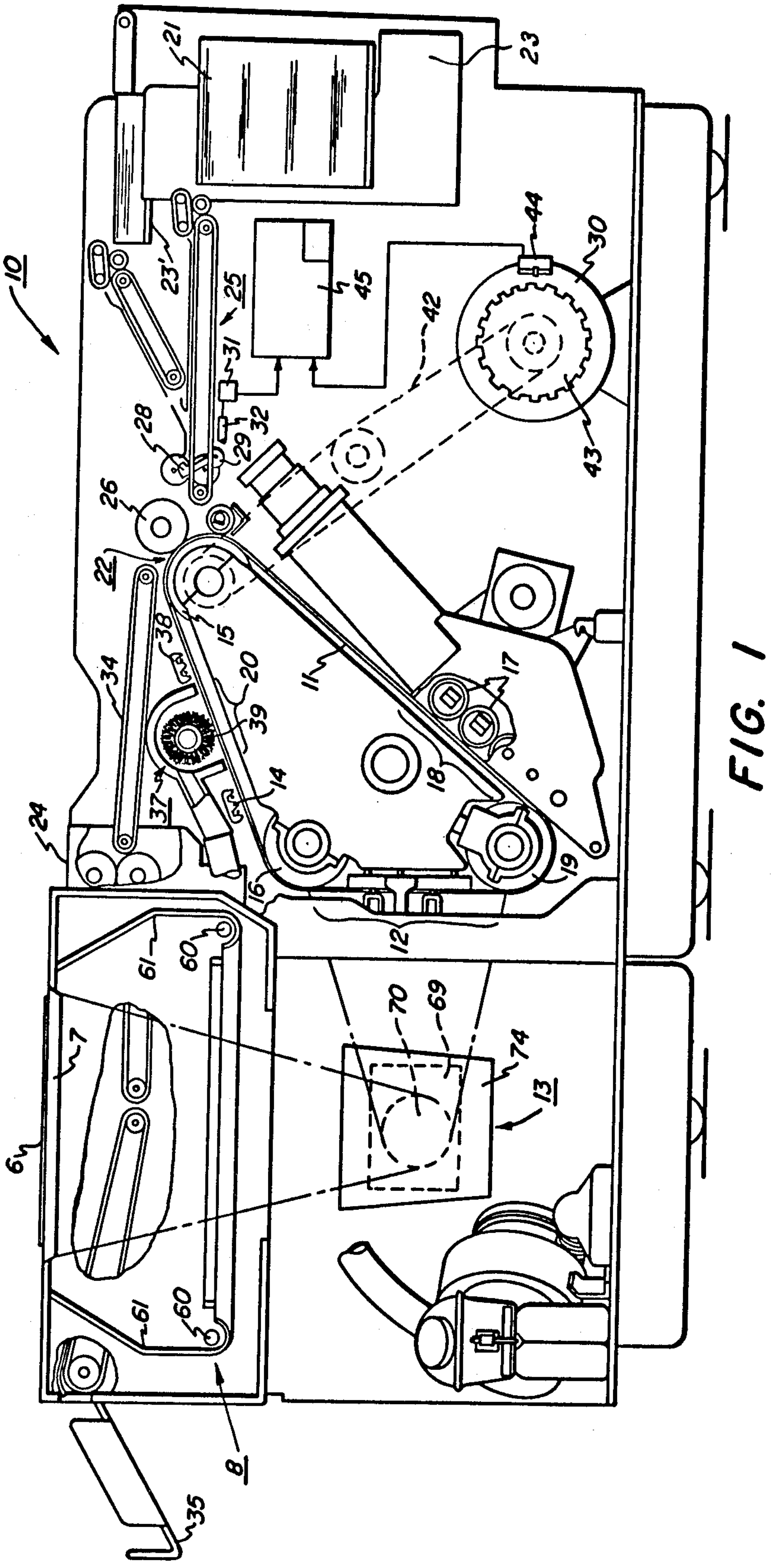
FIG. 1 is a side view in section of an exemplary reproduction machine of the type adapted to incorporate the exposure system of the present invention.

For a general understanding of an electrostatic type reproduction machine or copier in which the invention may be incorporated, reference is made to the drawing FIG. 1 wherein various components of an exemplary machine, designated generally by the numeral 10, are schematically illustrated. As in most electrostatic type machines, a light image of an original or object 6 to be copied or reproduced is projected onto the sensitized surface of a xerographic plate, herein in the form of an endless belt 11, to form an electrostatic latent image thereon. The latent image is then developed as by means of magnetic brushes 17 to form a xerographic powder image, corresponding to the latent image on belt 11. The powder image is then electrostatically transferred to a support surface such as a copy sheet 21 and then permanently fixed by fusing apparatus 24.

The electrostatically attractable developing material commonly used in magnetic brush developing apparatus such as illustrated comprises a pigmented resinous powder commonly referred to as "toner" and a "carrier" of larger granular beads. The latter may be formed with steel cores coated with a material removed in the triboelectric series from the toner so that a triboelectric charge is generated between the toner and the carrier. The magnetizable carrier also provides mechanical control for the formation of brush bristles by magnetic brushes 17 by virtue of magnetic fields generated by the brush magnets. This permits the toner to be readily handled and brought into contact with the exposed xerographic surface. The toner is then attracted to the electrostatic latent image on belt 11 from the carrier to produce a visible powder image.

In machine 10, original 6 to be copied is placed upon a transparent support platen 7 fixedly arranged in an illumination assembly, generally indicated by the reference numeral 8. The illumination system 8 includes two or more lamps 60 and attendant reflectors 61, lamps 60 serving when energized to flash light rays upon the original 6 to produce image rays corresponding thereto. The image rays are projected by means of an optical system 13, which includes a projection lens 70 and mirrors 69, 74. The optical system focuses the image rays on the photosensitive surface of the moving belt 11 at exposure station 12. Belt 11 moves in the direction indicated by the arrow and carries a uniform charge placed thereon by a corona device 14.

Exposure of the photosensitive surface of belt 11 to the light image discharges the photoconductive layer in the areas struck by light so that there remains on belt 11 a latent electrostatic image corresponding to the light image of original 6 as projected by the optical system 13. The electrostatic image so formed passes into operative contact with magnetic brushes 17 of developing station 18.

Belt 11 is stretched about three rollers 15, 16, 19 to form three relatively flat runs opposite exposure station 12, developing station 18, and cleaning station 20. Suitable means (not shown) such as vacuum panels may be utilized for maintaining the belt flat as the aforesaid belt runs.

The developed electrostatic image on belt 11 is transferred at transfer station 22, located at a point of tangency on the belt as it moves around roller 15, to a copy sheet 21. Sheet 21 is brought forward from a supply tray 23 by transport means 25 at a speed in synchronism with the moving belt. A transfer roller 26 is provided, roller 26 being electrically biased with sufficient voltage to electrostatically transfer the developed image from belt 11 onto copy sheet 21 as sheet 21 passes between the nip formed by belt 11 and roller 26.

A suitable copy sheet separating apparatus is provided for feeding one sheet 21 at a time from supply tray 23 to transport means 25. An auxiliary sheet supply tray 23' with transport is also provided.

Sheet transport means 25 includes sheet register fingers 28 adjacent the upstream side of transfer station 22, fingers 28 serving to place the individual copy sheets 21 in registration with the image on belt 11. Fingers 28 are supported upon rotatable shaft 29 driven from main machine motor 30. For correlating the operational timing of the several components of the reproduction machine 10, a control signal generator 31 is provided, pickup 32 of generator 31 being driven in unison with sheet register fingers 28. As a result, generator 31 puts out a control signal pulse once each revolution of fingers 28, the signal pulse from generator 31 representing a predetermined reference for timing machine operation.

After transfer, sheet 21 is stripped from belt 11, and conveyed by a conveying system 34 to fusing apparatus 24 wherein the toner image is permanently affixed to sheet 21. After fusing, the finished copy is discharged into the tray 35.

Toner particles remaining as residue from the developed images are removed by cleaning apparatus 37 positioned opposite the run of belt 11 between the rollers 15, 16. Cleaning apparatus 37 includes a corotron 38 for neutralizing charges remaining on the particles and a rotating brush 39 which operates in conjunction with a vacuum system to remove residual toner particles from the brush.

Belt 11 is driven in the direction shown by the solid line arrow by a constant speed drive motor 30 directly coupled to belt driving roller 15 by a suitable drive chain or timing belt 42. A timing gear 43 is carried on the output shaft of motor 30, gear 43 having a predetermined number of teeth cooperable with magnetic pickup element 44 mounted on the machine frame adjacent thereto. During rotation of gear 43, pickup 44 generates a series of closely spaced signal pulses which are input to control logic 45 via line 44'. Pulse-like signals from signal generator 31 are input to control logic 45 via line 31'. The signal pulse in lines 44', 31' cooperate to operate the various components of reproduction machine 10 in an integrated timed manner via control logic 45. For this purpose, the control logic 45 for machine 10 includes a suitable counting mechanism for counting and identifying individual pulses.

The pulse train from pickup 44 is fed to control logic 45 together with the pulse-like signals from pickup 32 of signal generator 31. In operation, the pulses from pickup 32 are used to mark or set the count each time fingers 28 reach a preset point in their rotation. Individual pulses from the resulting blocks of pulses obtained are then used to operate the various components of the machine 10 such as lamps 60 in an integrated timed manner.

As noted, lamps 60 of illumination assembly 8 serve to illuminate the platen 7 and any original object 6 thereon. In the prior art, the substantially instantaneous nature of illumination from flash lamps in this environment in effect stops the belt 11 to provide an image free of blur. However, the amount and intensity of light required to uniformly and completely illuminate the entire platen 7 from corner to corner in the space of a few microseconds is extremely large. As a result, flash lamps must have very large and relatively expensive power supplies. Normally, power supplies for this use are of the capacitance type wherein the electric power required to fire the flash lamps is stored on one or more capacitors which are discharged at the instant of flash.

To reduce the light required and thus the size and capacity of the lamp power supply, a moving image is generated on belt 11 by the optical system 13 permitting full frame exposure of the original to be made during an appreciable time period; i.e. the illumination and exposure are not "instantaneous" and the photoreceptor is not "stopped". This in turn permits the use of continuous operating lamps such as incandescent, fluorescent, or vapor lamps for example.

Figure 2:
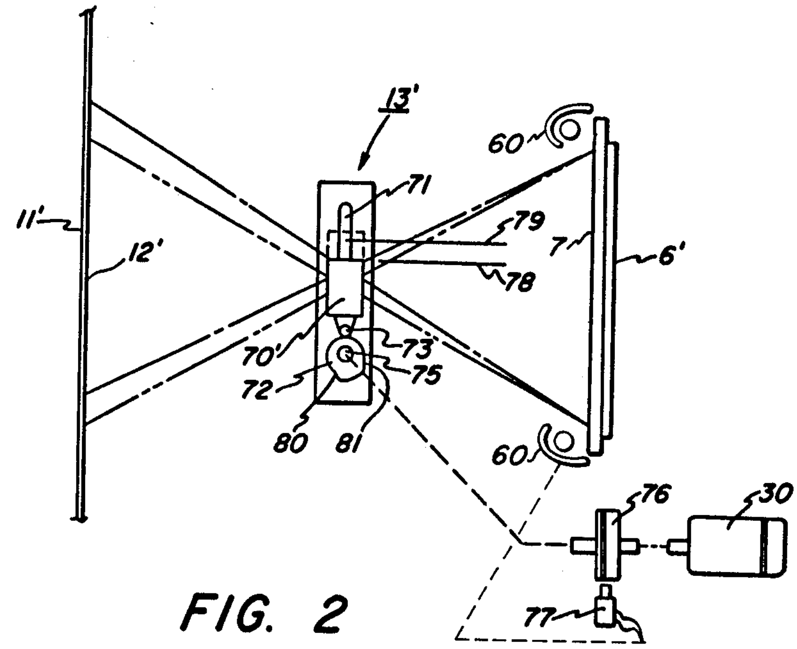
FIG. 2 is a schematic view of a direct optical exposure system illustrating the basic principles of the present invention.

Referring to the schematic showing in FIG. 2, the optical system 13' comprises a single lens 70' adapted to transmit light image rays of an original 6' onto a moving xerographic plate 11' at exposure station 12'. Lens 70' is suitably supported in tracks 71 for slidable back and forth movement in a direction substantially paralleling the path of movement of plate 11' through exposure station 12'. A rotatable lens-driving cam 72 is provided, cam follower 73 thereof being coupled to lens 70' to move lens 70' back and forth in tracks 71 in correspondence with the configuration of driving cam 72. Suitable biasing means (not shown) holds follower 73 in operative contact with the surface of cam 72. Cam 72 is carried on a shaft 75 which is drivingly connected through solenoid operated clutch 76 with the apparatus power source, such as motor 30.

Clutch 76 is of the type adapted upon energization of solenoid 77 thereof to rotate cam 72 through one revolution. During rotation, cam 72 moves lens 70' first forward from start position 78 (shown in solid line) to terminal position 79 (shown by dotted lines) and then back to start position 78. The forward slope 80 of the surface of cam 72 is such that during initial rotation of cam 72 (through an approximately 90° arc), lens 70' is moved at exactly ½ the speed of plate 11' presuming a 1:1 object-image size ratio. This prevents blurring or distortion of the images. Return slope 81 of cam 72 is configured to return lens 70' to the start position 78 at a speed sufficient to allow fresh surface of plate 11' to reach exposure station 12'. Normally, provision is made here for inclusion of any spacing between adjoining images.

Other proportional speed relationships or ratios between xerographic plate 11' and lens 70' may be contemplated where different size images are produced, as for example, where a reduced size image is projected onto xerographic plate 11'. In this circumstance, the configuration of lens drive cam 72 would be modified to provide the required lens speed. As will be understood, a change in configuration of cam 72 may be conveniently effected by substituting a cam having the desired configuration for the cam 72 already in place.

Figure 3:
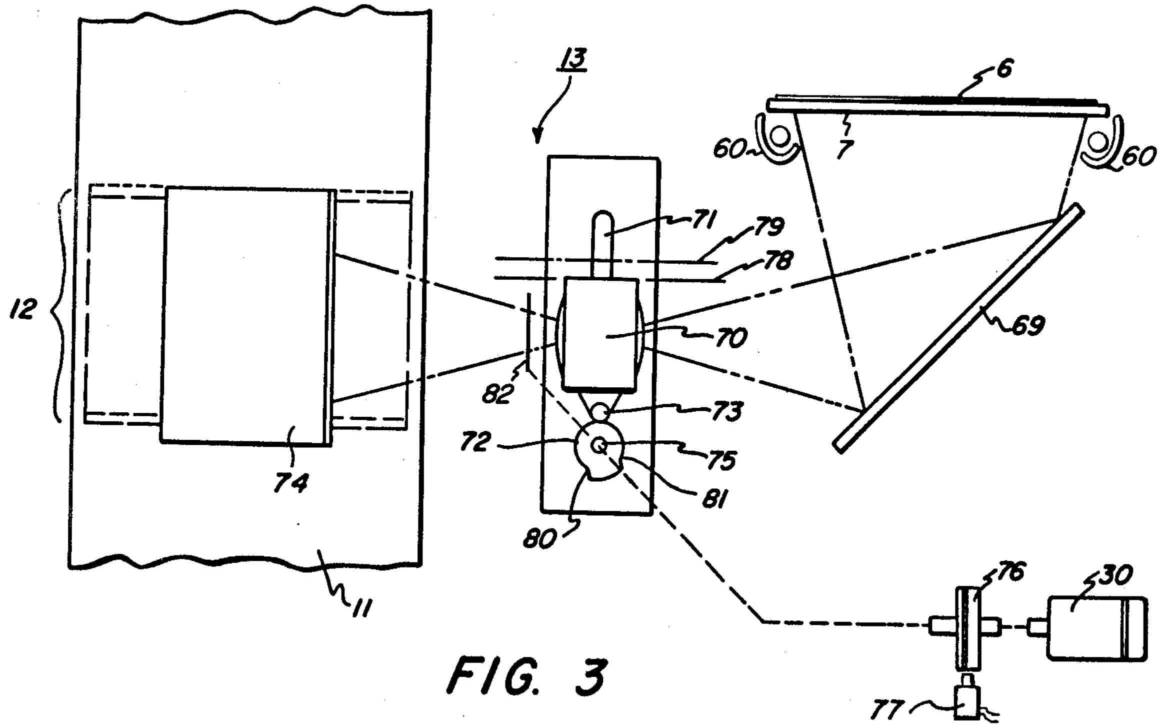
FIG. 3 is an enlarged top view showing the present invention incorporated into the reproduction machine shown in FIG. 1.

Referring now to FIGS. 1 and 3 of the drawings, lens 70 for reproduction machine 10 may be arranged for displacement along a path substantially paralleling the movement of belt 11 through exposure station 12 in the manner described heretofore in connection with FIG. 2. The optical system 13 for reproduction machine 10 includes a pair of mirrors 69, 74 for directing the light image rays from platen 7 to belt 11. Mirror 69 which is disposed below platen 7, serves to direct the image rays from platen 7 to the optical axis of lens 70 while mirror 74 serves to direct the image rays from lens 70 to the surface of belt 11 at exposure station 12.

Lamps 60 may be continuously operating, or they may be energized only for the duration of the exposure, that is during the lens travel from its start position at 78 to its forward position 79.

In the case of intermittent energization, FIG. 2 represents the interconnection between the lamps 60 and the intermittent power input shown at solenoid 77. In this arrangement, when clutch 76 is energized to move the lens 70, lamps 60 are simultaneously energized to illuminate the object 6.

In the case of continuous illumination, a shutter 82 must be used to prevent exposure of the photoreceptor belt 11 during return motion of the lens 70. In this case, represented in FIG. 3, shutter 82 is shown schematically operatively connected to the system by means of clutch 76 and cam 72. When clutch 76 is energized to move the lens 70 for exposure, shutter 82 is moved out of the path of the propagating object.

The foregoing description of certain embodiments of this invention is given by way of illustration and not of limitation. The concept and scope of the invention are limited only by the following claims and equivalent thereof which may occur to others skilled in the art.

What is claimed is:

1. In a reproduction machine for producing selectively one or more copies of an original, the reproduction machine including a movable photosensitive member; means to charge the photosensitive member in preparation for imaging; an exposure station whereat said charged photosensitive member is adapted to be exposed to a light image of the original; a platen for supporting the original; an image projecting means forming an optical path for transmitting a full frame light image of the original on the platen to the exposure station and the photosensitive member to form a latent electrostatic image of the original on said member; the combination of:

(a) illumination means to continuously illuminate the platen and the original thereon (b) optical path displacing means including a lens driving cam to displace the optical path and the full frame image formed by said image projecting means in uniform movement and in synchronism with said photosensitive member and in substantial parallelism with said photosensitive member at said exposure station, and (c) shutter means operatively connected to said cam to expose said photosensitive member to said light image during the uniform synchronous displacement of said optical path with said photosensitive member, and to prevent exposure of said photosensitive member to said light image during return of the optical path.

* * * * *